US012462989B2

(12) United States Patent
Ryu et al.

(10) Patent No.: US 12,462,989 B2
(45) Date of Patent: Nov. 4, 2025

(54) CROSS-LINKED POLYOLEFIN SEPARATOR AND MANUFACTURING METHOD THEREFOR

(71) Applicant: LG Chem, Ltd., Seoul (KR)

(72) Inventors: Bi-Oh Ryu, Daejeon (KR); Joo-Sung Lee, Daejeon (KR); Won-Sik Bae, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1005 days.

(21) Appl. No.: 17/044,026

(22) PCT Filed: Nov. 29, 2019

(86) PCT No.: PCT/KR2019/016800
§ 371 (c)(1),
(2) Date: Sep. 30, 2020

(87) PCT Pub. No.: WO2020/130412
PCT Pub. Date: Jun. 25, 2020

(65) Prior Publication Data
US 2021/0125792 A1    Apr. 29, 2021

(30) Foreign Application Priority Data
Dec. 21, 2018 (KR) .......................... 10-2018-0167962

(51) Int. Cl.
*H01G 11/52* (2013.01)
*B01D 67/00* (2006.01)
(Continued)

(52) U.S. Cl.
CPC ......... *H01G 11/52* (2013.01); *B01D 67/0079* (2013.01); *B01D 67/00931* (2022.08);
(Continued)

(58) Field of Classification Search
CPC ..... H01G 11/52; B29C 48/91; H01M 50/443; C08F 8/42; C08J 3/24; C08J 2323/04;
(Continued)

(56) References Cited

U.S. PATENT DOCUMENTS

2006/0127753 A1    6/2006   Nakashima et al.
2009/0098450 A1    4/2009   Kikuchi et al.
(Continued)

FOREIGN PATENT DOCUMENTS

CN            1860627 B       1/2011
CN          108189499 A        6/2018
(Continued)

OTHER PUBLICATIONS

English Machine Translation of Xu et al. CN 108735953 A (Year: 2018).*
(Continued)

*Primary Examiner* — Brian R Ohara
*Assistant Examiner* — Emily Elizabeth Freeman
(74) *Attorney, Agent, or Firm* — Lerner David LLP

(57) ABSTRACT

A crosslinked polyolefin separator and a method of making the same are disclosed herein. The method includes mixing a polyolefin, a diluting agent, an initiator, a crosslinking catalyst, and inorganic particles surface treated with an alkoxysilane containing a carbon-carbon double bonded group in an extruder to obtain a mixture, and then reactively extruding the mixture to form an extruded silane-grafted polyolefin composition; molding and orienting the extruded silane-grafted polyolefin composition in the form of an oriented sheet; extracting the diluting agent from the oriented sheet to obtain a porous membrane; thermally fixing the porous membrane to obtain a thermally fixed porous membrane; and crosslinking the thermally fixed porous membrane in the presence of moisture.

8 Claims, 1 Drawing Sheet

(51) Int. Cl.
*B01D 71/02* (2006.01)
*B01D 71/26* (2006.01)
*B01D 71/70* (2006.01)
*B29C 48/91* (2019.01)
*B29K 23/00* (2006.01)
*B29K 105/24* (2006.01)
*C08F 8/42* (2006.01)
*C08J 3/24* (2006.01)
*H01M 50/443* (2021.01)

(52) U.S. Cl.
CPC ......... *B01D 71/024* (2013.01); *B01D 71/261* (2022.08); *B01D 71/262* (2022.08); *B01D 71/70* (2013.01); *B29C 48/91* (2019.02); *C08F 8/42* (2013.01); *C08J 3/24* (2013.01); *H01M 50/443* (2021.01); *B29K 2023/065* (2013.01); *B29K 2105/24* (2013.01); *C08J 2323/04* (2013.01); *C08L 2312/08* (2013.01)

(58) Field of Classification Search
CPC .......... B29K 2023/065; B29K 2105/24; C08L 2312/08
See application file for complete search history.

(56) References Cited

U.S. PATENT DOCUMENTS

| | | | |
|---|---|---|---|
| 2013/0224587 A1* | 8/2013 | Uemura | C09D 5/24 429/211 |
| 2014/0287327 A1 | 9/2014 | Lee et al. | |
| 2015/0180003 A1* | 6/2015 | Kajita | H01M 50/426 429/144 |
| 2017/0355827 A1 | 12/2017 | Zhang et al. | |
| 2018/0233725 A1 | 8/2018 | Yasuda et al. | |
| 2023/0111013 A1* | 4/2023 | Zhang | H01M 10/0568 429/129 |

FOREIGN PATENT DOCUMENTS

| | | | | |
|---|---|---|---|---|
| CN | 108735953 A | * | 11/2018 | ........ H01M 10/0525 |
| JP | 2001302234 A | | 10/2001 | |
| JP | 2014173016 A | | 9/2014 | |
| KR | 20020058379 A | | 7/2002 | |
| KR | 101569136 B1 | | 11/2015 | |
| KR | 20150145309 A | * | 12/2015 | |
| KR | 101723994 B1 | | 4/2017 | |
| KR | 20170044996 A | | 4/2017 | |
| KR | 20180022670 A | | 3/2018 | |

OTHER PUBLICATIONS

Extended European Search Report for Application No. Ep 19898343.9, dated May 18, 2021, 9 pages.
Search report from International Application No. PCT/KR2019/016800, mailed Mar. 20, 2020.
Hirano, H., et al., "Treatment of Inorganic Filler Surface by Silane-Coupling Agent: Investigation of Treatment Condition and Analysis of Bonding State of Reacted Agent." International Journal of Chemical and Biological Engineering, vol. 6, 2012, pp. 29-33.
Zhang, J., et al., "Cross-Linked Nanohybrid Polymer Electrolytes With Poss Cross-Linker for Solid-State Lithium Ion Batteries." Frontiers in Chemistry, vol. 6, Article 186, Published May 25, 2018, pp. 1-10.
Search Report dated Dec. 6, 2021 from the Office Action for Chinese Application No. 201980024253.3 issued Dec. 15, 2021, 3 pages.
European Patent Application for Appln. No. 19898343.9 dated Nov. 14, 2023, pp. 1-7.
Ghosh, Premamoy, "Polymer Science Fundamentals of Polymer Science Molecular Weights of Polymers Contents Introduction Concept of Average Molecular Weight Number Average Molecular Weight Membrane Osmometry Weight Average Molecular Weight Assessment of Shape of Polymer Molecules Viscosity Average Molecular Weight Gener", Sep. 21, 2006 (Sep. 21, 2006 ), XP055608363, Retrieved from the Internet: <URL:http://nsdl.niscair.res.in/jspui/bitstream/123456789/406/2/> Molecular%20weights%20of%20polymers.pdf.

* cited by examiner

CROSS-LINKED POLYOLEFIN SEPARATOR AND MANUFACTURING METHOD THEREFOR

CROSS-REFERENCE TO RELATED APPLICATIONS

The present application is a national phase entry under 35 U.S.C. § 371 of International Application No. PCT/KR2019/016800, filed on Nov. 29, 2019, which claims priority from Korean Patent Application No. 10-2018-0167962, filed on Dec. 21, 2018, the disclosures of which are incorporated herein by reference.

TECHNICAL FIELD

The present disclosure relates to a crosslinked polyolefin separator and a method for manufacturing the same.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Such a lithium secondary battery includes a positive electrode, a negative electrode, an electrolyte and a separator. Particularly, it is required for the separator to have insulation property for separating the positive electrode and the negative electrode from each other and high ion conductivity for increasing lithium ion permeability based on high porosity.

In addition, it is required for the separator to have a broad interval between the shutdown temperature and the meltdown temperature so that a lithium secondary battery including the separator may ensure safety. To broaden the interval between the shutdown temperature and the meltdown temperature, it is required that the shutdown temperature is controlled to be decreased and the meltdown temperature is controlled to be increased.

As a method for increasing the meltdown temperature, there is use of a crosslinked polyolefin separator obtained by mixing polyethylene, a diluting agent, an initiator, a silane crosslinking agent and a crosslinking catalyst at once according to the related art.

However, when introducing the diluting agent and initiator to an extruder at once as mentioned above, there is a problem in that the diluting agent and initiator cause a side reaction. In addition, there is a difficulty in handling when the silane crosslinking agent is introduced to the extruder in combination with the diluting agent, or when the silane crosslinking agent is grafted directly to polyolefin and introduced to the extruder.

DISCLOSURE

Technical Problem

The present disclosure is directed to providing a cross-linked polyolefin separator having improved physical properties by inhibiting the side reaction of the diluting agent with the initiator, and a method for manufacturing the same.

In addition, it is possible to prevent the materials introduced to obtain a crosslinked polyolefin separator from being eliminated to the outside.

Technical Solution

In one aspect of the present disclosure, there is provided a silane-crosslinked polyolefin separator according to any one of the following embodiments.

According to the first embodiment of the present disclosure, there is provided a silane-crosslinked polyolefin separator including inorganic particles and crosslinked polyolefin having Si—O—Si crosslinking bonds, wherein silicon (Si) atoms of the Si—O—Si crosslinking bonds are chemically bound to the inorganic particles by means of oxygen (O) atoms.

According to the second embodiment of the present disclosure, there is provided the silane-crosslinked polyolefin separator as defined in the first embodiment, wherein at least one oxygen is chemically bound to the inorganic particles.

According to the third embodiment of the present disclosure, there is provided the silane-crosslinked polyolefin separator as defined in the first or the second embodiment, wherein the inorganic particles are metal particles and wherein a number of oxygen atoms used to chemically bond a silicon atom to a metal atom of the inorganic particles is the same as the oxidation number of the metal atom.

According to the fourth embodiment of the present disclosure, there is provided the silane-crosslinked polyolefin separator as defined in any one of the first to the third embodiments, wherein the crosslinked polyolefin includes a compound represented by the following Chemical Formula 1:

[Chemical Formula 1]

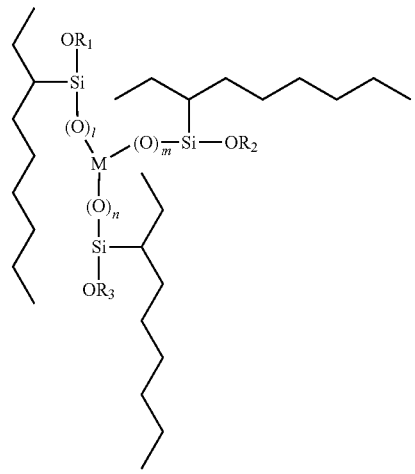

wherein M is metal, each of l, m and n is an integer of 0 or more, and each of $R_1$, $R_2$ and $R_3$ independently represents a C1-C10 alkoxy group or C1-C10 alkyl group, with the proviso that at least one of $R_1$, $R_2$ and $R_3$ is an alkoxy group.

According to the fifth embodiment of the present disclosure, there is provided the silane-crosslinked polyolefin separator as defined in any one of the first to the fourth embodiments, wherein the content of the inorganic particles is 5-70 wt % based on the total weight of the crosslinked polyolefin separator.

According to the sixth embodiment of the present disclosure, there is provided the silane-crosslinked polyolefin separator as defined in any one of the first to the fifth embodiments, wherein the inorganic particles are prepared from a metal hydroxide containing at least one hydroxyl group.

According to the seventh embodiment of the present disclosure, there is provided the silane-crosslinked polyolefin separator as defined in the sixth embodiment, wherein the metal of the metal hydroxide includes any one of aluminum, magnesium, silicon, zirconium, calcium, strontium, barium, antimony, tin, zinc and rare earth metal elements, or at least two elements of them.

According to the eighth embodiment of the present disclosure, there is provided the silane-crosslinked polyolefin separator as defined in the sixth embodiment, wherein the metal hydroxide includes any one of aluminum hydroxide, magnesium hydroxide, calcium hydroxide and boehmite, or at least two of them.

In another aspect of the present disclosure, there is also provided a method for manufacturing a crosslinked polyolefin separator according to any one of the following embodiments.

According to the ninth embodiment of the present disclosure, there is provided a method for manufacturing a cross-linked polyolefin separator, including the steps of:
 (S1) mixing a polyolefin, a diluting agent, an initiator, a crosslinking catalyst and surface-treated inorganic particles in an extruder, and then reactively extruding the mixture to form a silane-grafted polyolefin composition, wherein the surface-treated inorganic particles are prepared by surface-treating with an alkoxysilane containing a carbon-carbon double bonded group;
 (S2) molding and orienting the extruded silane-grafted polyolefin composition in the form of a sheet;
 (S3) extracting the diluting agent from the oriented sheet to obtain a porous membrane;
 (S4) thermally fixing the porous membrane; and
 (S5) crosslinking the thermally fixed porous membrane in the presence of moisture.

According to the tenth embodiment of the present disclosure, there is provided the method for manufacturing a crosslinked polyolefin separator as defined in the ninth embodiment, wherein the polyolefin has a weight average molecular weight of 200,000-1,000,000.

According to the eleventh embodiment of the present disclosure, there is provided the method for manufacturing a crosslinked polyolefin separator as defined in the ninth or the tenth embodiment, wherein the surface-treated inorganic particles having an alkoxysilane containing a carbon-carbon double bonded group coupled thereto via oxygen atoms.

According to the twelfth embodiment of the present disclosure, there is provided the method for manufacturing a crosslinked polyolefin separator as defined in any one of the ninth to the eleventh embodiments, wherein the surface-treated inorganic particles comprising compounds derived from hydrolysis of the alkoxysilane containing the carbon-carbon double bonded group, wherein the compounds are chemically bound to the inorganic particles via oxygen atoms.

According to the thirteenth embodiment of the present disclosure, there is provided the method for manufacturing a crosslinked polyolefin separator as defined in any one of the ninth to the twelfth embodiments, wherein the surface-treated inorganic particles are obtained by the steps of:
 (S10) hydrolyzing alkoxysilane containing a carbon-carbon double bonded group to prepare silanol containing a carbon-carbon double bonded group; and
  (S11) mixing the silanol containing a carbon-carbon double bonded group with inorganic particles containing at least one hydroxyl group to prepare the surface-treated inorganic particles.

According to the fourteenth embodiment of the present disclosure, there is provided the method for manufacturing a crosslinked polyolefin separator as defined in any one of the ninth to the thirteenth embodiments, wherein the mixing step is carried out at 25-80° C.

According to the fifteenth embodiment of the present disclosure, there is provided the method for manufacturing a crosslinked polyolefin separator as defined in any one of the ninth to the fourteenth embodiments, wherein the silane-grafted polyolefin composition includes polyolefin, silane grafted to the polyolefin, and inorganic particles bound to the silicon atoms of the grafted silane by means of oxygen.

According to the sixteenth embodiment of the present disclosure, there is provided the method for manufacturing a crosslinked polyolefin separator as defined in any one of the ninth to the fifteenth embodiments, wherein the alkoxysilane containing a carbon-carbon double bonded group used for surface-treatment of the inorganic particles are moisture-crosslinked with the polyolefin, in step (S5).

According to the seventeenth embodiment of the present disclosure, there is provided the method for manufacturing a crosslinked polyolefin separator as defined in any one of the ninth to the sixteenth embodiments, wherein the alkoxysilane containing a carbon-carbon double bonded group includes a compound represented by the following Chemical Formula 2:

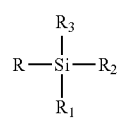

[Chemical Formula 2]

wherein each of $R_1$, $R_2$ and $R_3$ independently represents a C1-C10 alkoxy group or C1-C10 alkyl group, with the proviso that at least one of $R_1$, $R_2$ and $R_3$ represents an alkoxy group; and
 R represents a vinyl group, acryloxy group, methacryloxy group, or a C1-C20 alkyl group, wherein at least one hydrogen atom of the alkyl group is substituted with a vinyl group, acryloxy group, or methacryloxy group.

According to the eighteenth embodiment of the present disclosure, there is provided the method for manufacturing a crosslinked polyolefin separator as defined in any one of the ninth to the seventeenth embodiments, wherein the alkoxysilane containing a carbon-carbon double bonded group includes vinyltrimethoxysilane, vinyltriethoxysilane, vinyltriacetoxysilane, (3-methacryloxypropyl)trimethoxysilane, (3-methacryloxypropyl) triethoxysilane, vinylmethyl dimethoxysilane, vinyl-tris(2-methoxyethoxy)silane, vinyl-methyldiethoxysilane or a mixture of at least two of them.

Advantageous Effects

In the method for manufacturing a crosslinked polyolefin separator according to an embodiment of the present disclosure, inorganic particles surface-treated with alkoxysilane containing a carbon-carbon double bonded group are introduced. Thus, when silane-grafted polyolefin is extruded through an extruder, there is no problem of evaporation of unreacted alkoxysilane containing a carbon-carbon double bonded group. As a result, it is possible to provide a method for manufacturing a crosslinked polyolefin separator which causes no die-drooling phenomenon, i.e. a phenomenon of deposition of evaporated alkoxysilane containing a carbon-carbon double bonded group in the vicinity of the die inlet of the extruder.

According to an embodiment of the present disclosure, it is possible to provide a crosslinked polyolefin separator having low resistance, high air permeability and improved heat resistance.

According to an embodiment of the present disclosure, silane grafted to polyolefin is chemically bound to inorganic particles by means of oxygen. Thus, it is possible to provide a crosslinked polyolefin separator having improved heat resistance.

BEST MODE

Figure 1:
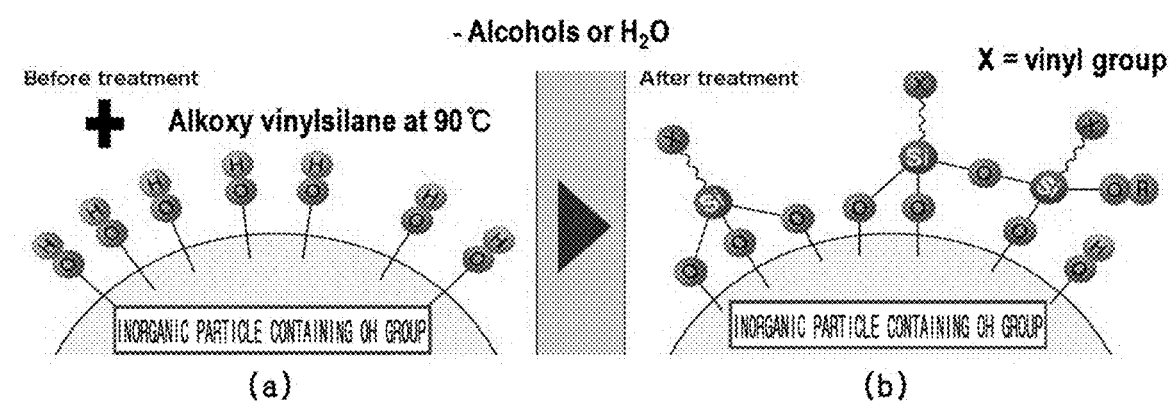
FIG. 1 is a schematic view illustrating a method for surface-treatment of inorganic particles with alkoxysilane containing a carbon-carbon double bonded group according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

As used herein, the expression 'one portion is connected to another portion' covers not only 'a portion is directly connected to another portion' but also 'one portion is connected electrically to another portion' by way of the other element interposed between them.

Throughout the specification, the expression 'a part includes an element' does not preclude the presence of any additional elements but means that the part may further include the other elements.

In addition, it will be understood that the terms "comprises" and/or "comprising", or "includes" and/or "including" when used in this specification, refer to the presence of any stated shapes, numbers, steps, operations, members, elements and/or groups thereof, but do not preclude the addition of one or more other shapes, numbers, steps, operations, members, elements and/or groups thereof.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination(s) thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

The present disclosure relates to a crosslinked polyolefin separator and a method for manufacturing the same.

An electrochemical device, such as a lithium secondary battery, which includes a separator showing a large difference between the shutdown temperature and the meltdown temperature has excellent safety.

Therefore, there is a need for a separator having a low shutdown temperature and a high meltdown temperature.

The inventors of the present disclosure manufactured a crosslinked polyolefin porous membrane using crosslinking in order to obtain a separator having a high meltdown temperature.

The inventors of the present disclosure have found that it is difficult to manufacture a crosslinked polyolefin separator using a silane crosslinking agent, while carrying out intensive studies about a crosslinked polyolefin porous membrane. For example, since a silane crosslinking agent is liquid, it is difficult to introduce it after grafting it to polyolefin, or to introduce it in combination with a diluting agent. In addition, when introducing silane-grafted polyolefin into an extruder, pressure in the extruder is increased, and thus the extrusion temperature should be limited. When using silane-grafted polyolefin in combination with general polyethylene, they are not blended well to cause non-homogeneous crosslinking. When a crosslinked polyolefin separator is manufactured by introducing a silane crosslinked agent to a diluting agent to solve the above-mentioned problems, pressure in the extruder is not increased, but it is difficult to control side reactions between the diluting agent and the silane crosslinking agent.

The inventors of the present disclosure have conducted intensive studies to solve the above-mentioned problems. The present disclosure is directed to providing a method for manufacturing a crosslinked polyolefin separator having improved processability and a crosslinked polyolefin separator having improved physical properties by using inorganic particles surface-treated with alkoxysilane containing a carbon-carbon double bonded group, while not introducing alkoxysilane containing a carbon-carbon double bonded group to polyolefin or a diluting agent.

Hereinafter, the present disclosure will be explained in more detail.

In one aspect of the present disclosure, there is provided a silane-crosslinked polyolefin separator including inorganic particles and crosslinked polyolefin having Si—O—Si crosslinking bonds, wherein silicon (Si) atoms of the Si—O—Si crosslinking bonds are chemically bound to the inorganic particles by means of oxygen (O) atoms.

Particularly, in the silane-crosslinked polyolefin separator, at least one oxygen is bound to the inorganic particles. More particularly, at least one oxygen may be chemically bound to the inorganic particles.

For example, the inorganic particles may be metal particles and the same number of oxygen as the oxidation number of the metal may be chemically bound to the inorganic particles.

For example, the crosslinked polyolefin may include a compound represented by the following Chemical Formula 1:

[Chemical Formula 1]

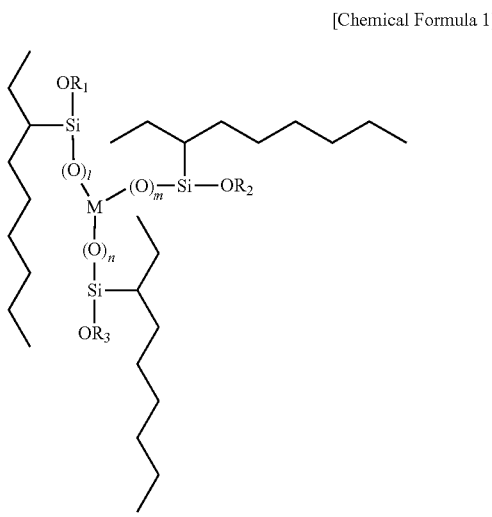

wherein M is metal, each of l, m and n is an integer of 0 or more, and each of $R_1$, $R_2$ and $R_3$ independently represents a C1-C10 alkoxy group or C1-C10 alkyl group, with the proviso that at least one of $R_1$, $R_2$ and $R_3$ is an alkoxy group.

According to an embodiment of the present disclosure, in the crosslinked polyolefin separator, alkoxysilanol containing a carbon-carbon double bonded group derived from alkoxysilane containing a carbon-carbon double bonded group is chemically bound with inorganic particles containing at least one hydroxyl group so that silicon may be chemically bound to the inorganic particles by means of oxygen atoms.

According to an embodiment of the present disclosure, silicon in the Si—O—Si crosslinking bonds may be chemically bound with polyolefin by means of oxygen atoms. Thus, it is possible to provide a crosslinked polyolefin separator having improved heat resistance.

According to an embodiment of the present disclosure, the inorganic particles may include at least one hydroxyl group.

The content of the inorganic particles may be 5-70 wt % based on the total weight of the crosslinked polyolefin separator. When the inorganic particles are present within the above-defined range, it is possible to provide a crosslinked polyolefin separator having improved heat resistance, low resistance and high air permeability.

According to an embodiment of the present disclosure, the crosslinked polyolefin separator may be a separator for a lithium secondary battery.

In another aspect of the present disclosure, there is provided a method for manufacturing a crosslinked polyolefin separator.

According to an embodiment of the present disclosure, the crosslinked polyolefin separator may be obtained by the following method, but is not limited thereto.

The method for manufacturing a crosslinked polyolefin separator according to an embodiment of the present disclosure includes the following steps:

(S1) introducing polyolefin, a diluting agent, an initiator, a crosslinking catalyst and inorganic particles surface-treated with alkoxysilane containing a carbon-carbon double bonded group to an extruder, followed by mixing, and then carrying out reactive extrusion of a silane-grafted polyolefin composition;

(S2) molding and orienting the reactive extruded silane-grafted polyolefin composition in the form of a sheet;

(S3) extracting the diluting agent from the oriented sheet to obtain a porous membrane;

(S4) thermally fixing the porous membrane; and (S5) crosslinking the thermally fixed porous membrane in the presence of moisture.

Hereinafter, the method for manufacturing a crosslinked polyolefin separator according to an embodiment of the present disclosure will be explained in more detail.

First, polyolefin, a diluting agent, an initiator, a crosslinking catalyst and inorganic particles surface-treated with alkoxysilane containing a carbon-carbon double bonded group are introduced to an extruder (S1).

According to the present disclosure, alkoxysilane containing a carbon-carbon double bonded group is not introduced as it is, but is introduced after being coupled with inorganic particles. Thus, no side reactions between the diluting agent and alkoxysilane containing a carbon-carbon double bonded group occur. In other words, highly volatile alkoxysilane containing a carbon-carbon double bonded group is chemically bound to the inorganic particles. Therefore, when extruding silane-grafted polyolefin through the extruder, there is no problem of evaporation of non-reacted alkoxysilane containing a carbon-carbon double bonded group. As a result, it is possible to reduce a die-drooling phenomenon, i.e. a phenomenon of deposition of evaporated alkoxysilane containing a carbon-carbon double bonded group in the vicinity of the die inlet of the extruder.

In addition, since the inorganic particles are introduced after being surface-treated with alkoxysilane containing a carbon-carbon double bonded group and the carbon-carbon double bonded group is grafted to polyolefin forming the separator as described above, a plurality of inorganic particles can be incorporated to the finished crosslinked polyolefin separator. As a result, it is possible to form vacant spaces by the inorganic particles contained in the finished crosslinked polyolefin separator, and thus the resultant crosslinked polyolefin separator shows low resistance and improved air permeability.

In addition, inorganic particles have a significantly higher melting point as compared to polyolefin. Thus, it is possible to provide the finished crosslinked polyolefin separator with improved heat resistance through the grafting of inorganic particles to polyolefin by means of silane.

According to an embodiment of the present disclosure, the inorganic particles surface-treated with alkoxysilane containing a carbon-carbon double bonded group may be obtained by the steps of: (S10) hydrolyzing alkoxysilane containing a carbon-carbon double bonded group to prepare silanol containing a carbon-carbon double bonded group; and (S11) mixing the silanol containing a carbon-carbon double bonded group with inorganic particles containing at least one hydroxyl group, but are not limited thereto.

The above-mentioned steps can be understood from FIG. 1 and FIGS. 2(a) to (e).

Figure 2:
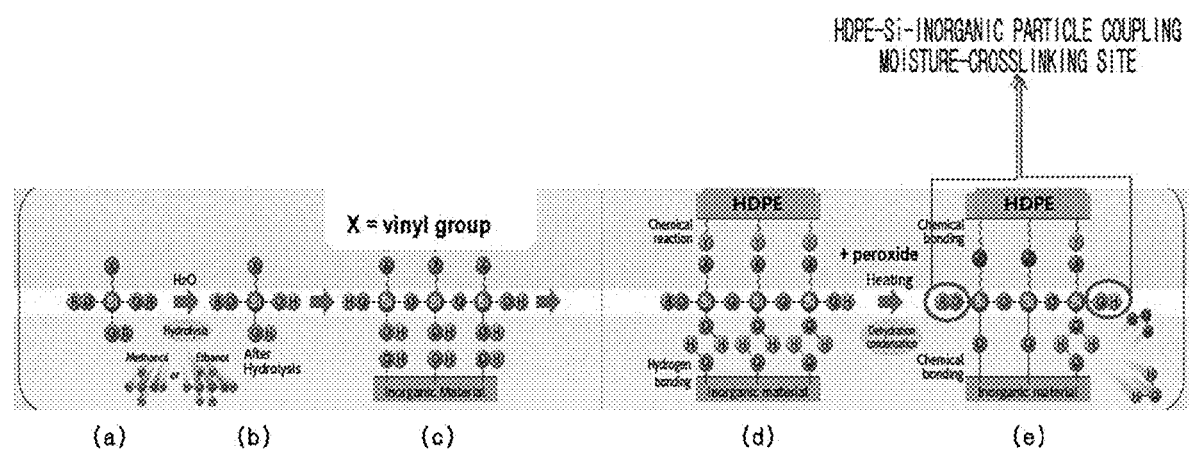
FIGS. 2(a) to (e) are schematic views illustrating a method for manufacturing a crosslinked polyolefin separator according to an embodiment of the present disclosure.

Particularly, as shown in FIG. 2(a) and FIG. 2(b), alkoxysilane containing a carbon-carbon double bonded group is hydrolyzed to obtain silanol containing a carbon-carbon double bonded group.

Next, the silanol containing a carbon-carbon double bonded group is mixed with inorganic particles containing at least one hydroxyl group (FIG. 2(c)). As can be seen from FIG. 1, the inorganic particles surface-treated with alkoxysilane containing a carbon-carbon double bonded group include at least one alkoxy group in the silane group, and silicon is chemically bound to the inorganic particles by means of oxygen atoms.

According to an embodiment of the present disclosure, the inorganic particles surface-treated with alkoxysilane containing a carbon-carbon double bonded group may be obtained by the method including a step of hydrolyzing alkoxysilane containing a carbon-carbon double bonded group to prepare silanol containing a carbon-carbon double bonded group (S10). Herein, silanol means a compound containing a Si—OH group.

Particularly, alkoxysilane containing a carbon-carbon double bonded group is allowed to react with a hydroxyl group-containing solvent first so that at least one alkoxy group of the alkoxysilane containing a carbon-carbon double bonded group may be converted into a hydroxyl group (OH group). For example, a solvent, such as water, methanol, ethanol or propanol, and the alkoxysilane containing a carbon-carbon double bonded group may be hydrolyzed to prepare alkoxysilanol containing a carbon-carbon double bonded group.

According to an embodiment of the present disclosure, the silanol containing a carbon-carbon double bonded group may include at least one hydroxyl group and at least one alkoxy group. The hydroxyl group contained in the silanol containing a carbon-carbon double bonded group functions to link Si with inorganic particles by means of oxygen through dehydration with the hydroxyl group of the inorganic particles. The alkoxy group contained in the silanol containing a carbon-carbon double bonded group becomes a site participating in moisture-crosslinking with polyolefin by the following step (S5). This can be seen from FIG. 2(d) and FIG. 2(e).

Then, according to an embodiment of the present disclosure, the silanol containing a carbon-carbon double bonded group may be mixed with inorganic particles containing at least one hydroxyl group. The hydroxyl group in the inorganic particles undergoes hydrogen bonding with the hydroxyl group in the silanol containing a carbon-carbon double bonded group to carry out dehydration-condensation at high temperature in the presence of an initiator. In this manner, it is possible to obtain a product in which silicon in the silane compound is chemically bound to the inorganic particles by means of oxygen. According to an embodiment of the present disclosure, the product may be inorganic particles surface-treated with alkoxysilane containing a carbon-carbon double bonded group. This can be seen from FIG. 1.

According to an embodiment of the present disclosure, the step of mixing the silanol containing a carbon-carbon double bonded group with the inorganic particles may be carried out at 25-80° C., 30-70° C., or 40-60° C. When the mixing step is carried out within the above-defined temperature range, the silanol containing a carbon-carbon double bonded group may significantly react with the inorganic particles without evaporation of the silanol containing a carbon-carbon double bonded group.

Particularly, it is preferred to control the temperature range to 40-60° C. with a view to reducing a phenomenon of self-heating in the step of mixing the silanol containing a carbon-carbon double bonded group with the inorganic particles.

According to an embodiment of the present disclosure, in the inorganic particles surface-treated with alkoxysilane containing a carbon-carbon double bonded group, inorganic particles containing at least one hydroxyl group is coupled with alkoxysilane containing a carbon-carbon double bonded group.

According to an embodiment of the present disclosure, in the inorganic particles surface-treated with alkoxysilane containing a carbon-carbon double bonded group, the compound derived from hydrolysis of the alkoxysilane containing a carbon-carbon double bonded group is chemically bound to the inorganic particles by means of oxygen atoms. The compound derived from hydrolysis of the alkoxysilane containing a carbon-carbon double bonded group may be silanol containing a carbon-carbon double bonded group.

According to an embodiment of the present disclosure, the inorganic particles may be metal hydroxide particles containing at least one hydroxyl group.

According to an embodiment of the present disclosure, the metal hydroxide may be hydroxide containing one or more elements selected from the group consisting of aluminum, magnesium, silicon, zirconium, calcium, strontium, barium, antimony, tin, zinc and rare earth metal elements.

According to an embodiment of the present disclosure, the metal hydroxide may be aluminum hydroxide, magnesium hydroxide, calcium hydroxide or boehmite.

According to an embodiment of the present disclosure, the alkoxysilane containing a carbon-carbon double bonded group is a crosslinking agent that causes silane crosslinking. The hydroxyl group in the alkoxysilanol containing a carbon-carbon double bonded group, derived from hydrolysis, may react with the hydroxyl group in the inorganic particles containing at least one hydroxyl group to cause chemical binding. Meanwhile, the alkoxysilane containing a carbon-carbon double bonded group is grafted to polyolefin through the carbon-carbon double bonded group, and moisture-crosslinking is carried out through the alkoxy group to perform crosslinking of polyolefin.

According to an embodiment of the present disclosure, the alkoxysilane containing a carbon-carbon double bonded group may include a compound represented by the following Chemical Formula 2:

[Chemical Formula 2]

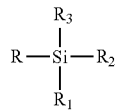

wherein each of $R_1$, $R_2$ and $R_3$ independently represents a C1-C10 alkoxy group or C1-C10 alkyl group, with the proviso that at least one of $R_1$, $R_2$ and $R_3$ represents an alkoxy group; and R represents a vinyl group, acryloxy group, methacryloxy group, or a C1-C20 alkyl group, wherein at least one hydrogen atom of the alkyl group is substituted with a vinyl group, acryloxy group, or methacryloxy group.

Meanwhile, R may further include an amino group, epoxy group or an isocyanate group.

According to an embodiment of the present disclosure, the alkoxysilane containing a carbon-carbon double bonded group may include vinyltrimethoxysilane, vinyltriethoxysilane, vinyltriacetoxysilane, (3-methacryloxypropyl)trimethoxysilane, (3-methacryloxypropyl)triethoxysilane, vinylmethyl dimethoxysilane, vinyl-tris(2-methoxyethoxy)silane, vinylmethyldiethoxysilane or a mixture of at least two of them.

According to an embodiment of the present disclosure, the silane-grafted polyolefin composition may include polyolefin, silane grafted to the polyolefin, and inorganic particles bound to silicon of the grafted silane by means of oxygen.

According to an embodiment of the present disclosure, the polyolefin may be polyethylene; polypropylene; polybutylene; polypentene; polyhexene; polyoctene; a copolymer of at least two of ethylene, propylene, butene, pentene, 4-methylpentene, hexene and octene; or a mixture thereof. Particularly, polyethylene includes low-density polyethylene (LDPE), linear low-density polyethylene (LLDPE), high-density polyethylene (HDPE), or the like. Among those, high-density polyethylene having a high crystallization degree and a high resin melting point is most preferred.

According to an embodiment of the present disclosure, the polyolefin may have a weight average molecular weight of 200,000-1,000,000, 220,000-700,000, or 250,000-500,000. According to the present disclosure, it is possible to obtain a separator having excellent strength and heat resistance, while ensuring uniformity of the separator and film-forming processability, by using polyolefin having a high weight average molecular weight of 200,000-1,000,000 as a starting material for the manufacture of the separator.

According to an embodiment of the present disclosure, the diluting agent may include liquid or solid paraffin oil, mineral oil, wax, soybean oil, or the like, used currently for manufacturing a separator through a wet process.

According to an embodiment of the present disclosure, the diluting agent may be one capable of liquid-liquid phase separation against polyolefin. For example, the diluting agent may be a phthalic acid ester, such as dibutyl phthalate, dihexyl phthalate, dioctyl phthalate, or the like; aromatic ether, such as diphenyl ether, benzyl ether, or the like; C10-C20 fatty acid, such as palmitic acid, stearic acid, oleic acid, linolic acid, linoleic acid, or the like; C10-C20 fatty acid alcohol, such as palmitic acid alcohol, stearic acid alcohol, oleic acid alcohol, or the like; saturated or unsaturated fatty acid whose fatty acid group has 4-26 carbon atoms, such as palmitic acid mono-, di- or tri-ester, stearic acid mono-, di- or tri-ester, oleic acid mono-, di- or tri-ester, linoleic acid mono-, di- or tri-ester, or the like; or a fatty acid ester in which one or at least two fatty acids having an epoxy-substituted double bond of unsaturated fatty acid are ester-bound with a C1-C10 alcohol having 1-8 hydroxyl groups.

The diluting agent may include any one of the above-described ingredients or a mixture of at least two of them.

According to an embodiment of the present disclosure, the content of the diluting agent may be 100-350 parts by weight, 125-300 parts by weight, or 150-250 parts by weight, based on 100 parts by weight of the total weight of the polyolefin. When the total content of the diluting agent satisfies the above-defined range, it is possible to reduce the problems caused by an increase in polyolefin content, such as a decrease in porosity and pore size, reduced interconnection among pores and a significant decrease in permeability, an increase in viscosity of a polyolefin composition and extrusion load, and a difficulty in processing. It is also possible to reduce the problems caused by a decrease in polyolefin content, such as breakage upon orientation and non-uniform thickness, caused by a decrease in compatibility of polyolefin with a diluting agent and extrusion of polyolefin in the form of gel without thermodynamic blending of polyolefin with a diluting agent.

According to an embodiment of the present disclosure, the crosslinking catalyst is added to accelerate silane crosslinking.

According to an embodiment of the present disclosure, the crosslinking catalyst may be a carboxylate of metal, such as tin, zinc, iron, zinc or cobalt, organic base, inorganic acid or an organic acid. Non-limiting examples of the crosslinking catalyst include metal carboxylates, such as dibutyltin dilaurate, dibutyltin diacetate, stannous acetate, stannous caprylate, zinc naphthenate, zinc caprylate and cobalt naphthenate, organic bases, such as ethylamine, dibutylamine, hexylamine and pyridine, inorganic acids, such as sulfuric acid and hydrochloric acid, and organic acids, such as toluene sulfonic acid, acetic acid, stearic acid and maleic acid. Such crosslinking agents may be used alone or in combination.

According to an embodiment of the present disclosure, the content of the crosslinking catalyst may be 0.1-20 parts by weight, 0.5-10 parts by weight, or 1-5 parts by weight, based on 100 parts by weight of the total alkoxysilane containing a carbon-carbon double bonded group. When the content of the crosslinking catalyst satisfies the above-defined range, it is possible to carry out silane crosslinking to a desired level and to prevent undesired side reactions in a lithium secondary battery. In addition, there is no cost-related problem, such as waste of the catalyst.

According to an embodiment of the present disclosure, if necessary, the silane-grafted polyolefin composition may further include conventional additives for improving specific functions, such as an antioxidant, UV stabilizer, antistatic agent, nucleating agent, or the like.

According to an embodiment of the present disclosure, the initiator may be any initiator, as long as it can generate radicals. Non-limiting examples of the initiator include 2,5-dimethyl-2,5-di(tert-butylperoxy)hexane (DHBP), benzoyl peroxide, acetyl peroxide, dilauryl peroxide, di-tert-butyl peroxide, dicumyl peroxide, cumyl peroxide, hydrogen peroxide, potassium persulfate, or the like.

According to an embodiment of the present disclosure, the content of the initiator may be 0.1-2.0 parts by weight, 0.2-1.5 parts by weight, or 0.3-1.25 parts by weight, based on 100 parts by weight of the total alkoxysilane a carbon-carbon double bonded group. When the content of the initiator satisfies the above-defined range, it is possible to prevent the problems of a decrease in silane graft ratio, caused by a low content of initiator, and crosslinking between polyethylene molecules in an extruder, caused by a high content of initiator.

According to an embodiment of the present disclosure, the reactive extrusion step may be carried out by using a uniaxial extruder or biaxial extruder.

Next, the extruded silane-grafted polyolefin composition is molded in the form of a sheet and oriented (S2).

For example, the reactive extruded silane-grafted polyolefin composition is extruded by using an extruder equipped with a T-die, or the like, and then cooled extrudate may be formed by using a general casting or calendaring process using water-cooling or air-cooling mode.

According to an embodiment of the present disclosure, it is possible to provide a separator having improved mechanical strength and puncture strength through the orientation step as mentioned above.

According to an embodiment of the present disclosure, the orientation may be carried out by sequential or simultaneous orientation using a roll or tenter. The orientation ratio may be 3 times or more, or 4-10 times, each in the machine direction and transverse direction, and the total orientation ratio may be 14-100 times. When the orientation ratio satisfies the above-defined ratio, it is possible to prevent the problem of insufficient orientation in one direction, a failure in balance of physical properties between the machine direction and the transverse direction, and degradation of tensile strength and puncture strength. When the total orientation ratio satisfies the above-defined range, it is possible to prevent the problems of non-orientation or a failure in pore formation.

According to an embodiment of the present disclosure, the orientation temperature may be varied with the melting point of polyolefin and concentration and type of the diluting agent.

According to an embodiment of the present disclosure, when the polyolefin is polyethylene, the diluting agent is liquid paraffin and the liquid paraffin has a dynamic viscosity of 50-150 cSt at 40° C., the orientation temperature may be 70-160° C., 90-140° C., or 100-130° C. in the machine direction (MD), and may be 90-180° C., 110-160° C., or 120-150° C. in the transverse direction (TD). When carrying out orientation in both directions at the same time, the orientation temperature may be 90-180° C., 110-160° C., or 110-150° C.

When the orientation temperature satisfies the above-defined range, it is possible to prevent the problem of breakage or non-orientation caused by the lack of softness resulting from a low orientation temperature. In addition, it is possible to prevent over-orientation or a difference in physical properties, caused by a high orientation temperature.

Then, the diluting agent is extracted from the molded and oriented sheet to obtain a porous membrane (S3).

According to an embodiment of the present disclosure, the diluting agent may be extracted from the porous membrane by using an organic solvent, and then the porous membrane may be dried.

According to an embodiment of the present disclosure, the organic solvent is not particularly limited, as long as it is capable of extraction of the diluting agents. However, it is suitable to use methyl ethyl ketone, methylene chloride or hexane having high extraction efficiency and showing a high drying rate.

According to an embodiment of the present disclosure, the extraction process may be any conventional solvent extraction process, such as an immersion process, solvent spray process or ultrasonication process, and such processes may be used alone or in combination. After carrying out extraction, the content of residual diluting agents should be preferably 1 wt % or less. When the content of residual diluting agent is larger than 1 wt %, physical properties are degraded and permeability of the porous membrane is reduced. The content of residual diluting agent may be affected by extraction temperature and extraction time. To increase the solubility of diluting agents in the organic solvent, a higher extraction temperature is preferred. However, considering the safety problem caused by boiling of the organic solvent, the extraction temperature is preferably 40° C. or lower. When the extraction temperature equals to or is lower than the solidifying point of the diluting agent, extraction efficiency may be decreased significantly. Thus, the extraction temperature should be higher than the solidifying point of the diluting agents.

In addition, the extraction time may be varied with the thickness of a porous membrane. In the case of a separator having a thickness of 5-15 μm, the extraction time may be 2-4 minutes suitably.

Then, the porous membrane is thermally fixed (S4).

The thermal fixing is a process of fixing and heating the porous membrane so that the porous membrane to be shrunk may be fixed forcibly to remove residual stress.

According to an embodiment of the present disclosure, when the polyolefin is polyethylene, the thermal fixing temperature may be 100-140° C., 105-135° C., or 110-130° C. When the polyolefin is polyethylene and the thermal fixing temperature satisfies the above-defined range, polyolefin molecules may be rearranged to remove residual stress of the porous membrane, and the problem of pore blocking of the porous membrane caused by partial melting may be reduced.

According to an embodiment of the present disclosure, the thermal fixing time may be 10-120 seconds, 20-90 seconds, or 30-60 seconds. When the thermal fixing is carried out for the above-defined range of time, polyolefin molecules may be rearranged to remove residual stress of the porous membrane, and the problem of pore blocking of the porous membrane caused by partial melting may be reduced.

After that, the thermally fixed porous membrane is crosslinked in the presence of moisture (S5).

According to an embodiment of the present disclosure, the crosslinking may be carried out at 60-100° C., 65-95° C., or 70-90° C.

According to an embodiment of the present disclosure, the crosslinking may be carried out under a humidity of 60-95% for 6-50 hours.

According to an embodiment of the present disclosure, in step (S5), the inorganic particles surface-treated with alkoxysilane containing a carbon-carbon double bonded group and polyolefin may be moisture crosslinked.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

(1) Preparation of Inorganic Particles Surface-Treated with Silane

Magnesium hydroxide (Nabaltech Co., APYMAG100) and vinyltrimethoxysilane were introduced to a Henschel mixer at a ratio (weight ratio) of 25:1 and mixed therein under the condition of a relative humidity of 50%, 150 rpm and 50° C. to obtain inorganic particles surface-treated with silane. Particularly, vinyltrimethoxysilane was hydrolyzed under the condition of a relative humidity of 50%, 150 rpm and 50° C. through mixing to provide vinyltrimethoxysilanol, which, in turn, was allowed to react with the hydroxyl group of magnesium hydroxide to provide inorganic particles surface-treated with silane. Herein, vinyltrimethoxysilane was used as alkoxysilane containing a carbon-carbon double bonded group, and was introduced in an amount of 1 part by weight based on 100 parts by weight of the total content of polyolefin and diluting agent used in the following Example 1-(2).

(2) Manufacture of Crosslinked Polyolefin Separator

First, 10.5 kg of high-density polyethylene (Korea Petrochemical Ind. Co. Ltd., VH035, melting point 135° C.) having a weight average molecular weight of 400,000 as polyolefin, 13.65 kg/hr of liquid paraffin oil (Kukdong Oil & Chem. LP350F, dynamic viscosity 50 cSt at 40° C.) as a diluting agent, and 20 kg of the inorganic particles surface-treated with silane according to Example 1-(1), were introduced to an extruder and mixed therein. Herein, the weight ratio of polyolefin: diluting agent: inorganic particles surface-treated with silane was 25:55:20.

Meanwhile, 2,5-dimethyl-2,5-di(tert-butylperoxy)hexane (DHBP) as an initiator was introduced to the extruder in an amount of 5 parts by weight based on 100 parts by weight of the alkoxysilane containing a carbon-carbon double bonded group according to Example 1-(1). In addition, dibutyltin dilaurate as a crosslinking catalyst was added in an amount of 5 parts by weight based on 100 parts by weight of the alkoxysilane containing a carbon-carbon double bonded group according to Example 1-(1).

It is possible to significantly reduce side reactions caused by direct contact between the initiator and the alkoxysilane containing a carbon-carbon double bonded group by introducing the alkoxysilane containing a carbon-carbon double bonded group at a time point different from the time point of introducing the initiator and crosslinking catalyst as mentioned above.

Then, reactive extrusion was carried out at a temperature of 220° C. to obtain a silane-grafted polyethylene composition.

The resultant silane-grafted polyethylene composition was molded into a sheet-like shape through a T-die and cold casting roll. Then, biaxial orientation was carried out by using a tenter-type sequential orienting machine performing MD orientation and then TD orientation. The MD orientation ratio and the TD orientation ratio were 6.5 times and 5 times, respectively. The orientation temperature was 95° C. in MD and 105° C. in TD.

After that, the diluting agent was extracted from the oriented sheet by using methylene chloride, and the sheet was thermally fixed at 132° C. with an orientation ratio from 1.6 to 1.4 times to obtain a porous membrane. The porous membrane was crosslinked at 85° C. under a humidity condition of 85% for 48 hours to obtain a crosslinked polyethylene separator.

Herein, the resultant crosslinked polyethylene separator includes crosslinked polyethylene having Si—O—Si crosslinking bonds, wherein the inorganic particles are chemically bound to silicon (Si) of the Si—O—Si crosslinking bonds by means of oxygen (O) by virtue of the use of the inorganic particles surface-treated with silane according to Example 1-(1).

In addition, the content of the inorganic particles was 37 wt % based on the total weight of the crosslinked polyolefin separator.

Example 2

(1) Preparation of Inorganic Particles Surface-Treated with Silane

Boehmite (Nabaltech Co., ACTILOX 200 SM) and vinyltrimethoxysilane were introduced to a Henschel mixer at a ratio (weight ratio) of 25:1 and mixed therein under the condition of a relative humidity of 50%, 150 rpm and 50° C. to obtain inorganic particles surface-treated with silane. Herein, vinyltrimethoxysilane was used as alkoxysilane containing a carbon-carbon double bonded group, and was introduced in an amount of 1 part by weight based on 100 parts by weight of the total content of polyolefin and diluting agent used in the following Example 1-(2).

A crosslinked polyolefin separator was obtained in the same manner as Example 1, except that the inorganic particles surface-treated with silane according to Example 2-(1) was used instead of the inorganic particles surface-treated with silane according to Example 1-(1).

Herein, the resultant crosslinked polyethylene separator has crosslinked polyethylene having Si—O—Si crosslinking bonds, wherein the inorganic particles are chemically bound to silicon (Si) of the Si—O—Si crosslinking bonds by means of oxygen (O) by virtue of the use of the inorganic particles surface-treated with silane according to Example 2-(1).

In addition, the content of the inorganic particles was 38 wt % based on the total weight of the crosslinked polyolefin separator.

Comparative Example 1 (No Inorganic Particles Introduced)

First, high-density polyethylene (Korea Petrochemical Ind. Co. Ltd., VH035, melting point 135° C.) having a weight average molecular weight of 400,000 as polyolefin, and liquid paraffin oil (Kukdong Oil & Chem. LP350F, dynamic viscosity 50 cSt at 40° C.) as a diluting agent were introduced to an extruder at a weight ratio of 50:50. Extruded amount was 80 kg/hr, wherein the extruded amount of polyethylene was 21 kg/hr and that of the diluting agent was 59 kg/hr. In addition, trimethoxyvinylsilane was introduced as alkoxysilane containing a carbon-carbon double bonded group in an amount of 2 parts by weight based on 100 parts by weight of the total content of polyolefin and diluting agent. Further, 2,5-dimethyl-2,5-di (tert-butylperoxy)hexane (DHBP) as an initiator was introduced in an amount of 5 parts by weight based on 100 parts by weight of the alkoxysilane containing a carbon-carbon double bonded group. In addition, dibutyltin dilaurate as a crosslinking catalyst was added in an amount of 5 parts by weight based on 100 parts by weight of the alkoxysilane containing a carbon-carbon double bonded group.

The above-mentioned ingredients were introduced to and kneaded in a biaxial extruder and reactive extrusion was carried out at a temperature of 220° C. to obtain a silane-grafted polyethylene composition.

The resultant silane-grafted polyethylene composition was molded into a sheet-like shape through a T-die and cold casting roll. Then, biaxial orientation was carried out by using a tenter-type sequential orienting machine performing MD orientation and then TD orientation. The MD orientation ratio and the TD orientation ratio were 6.5 times and 5 times, respectively. The orientation temperature was 95° C. in MD and 105° C. in TD.

After that, the diluting agent was extracted from the oriented sheet by using methylene chloride, and the sheet was thermally fixed at 132° C. with an orientation ratio from 1.6 to 1.4 times to obtain a porous membrane. The porous membrane was crosslinked at 85° C. under a humidity condition of 85% for 48 hours to obtain a crosslinked polyethylene separator.

Comparative Example 2 (No Inorganic Particles Introduced)

A crosslinked polyolefin separator was obtained in the same manner as Comparative Example 1, except that high-density polyethylene as high-density polyolefin and silane-grafted polyethylene (Hyundai EP, XP650) were introduced at a weight ratio of 15:15.

Particularly, high-density polyethylene (Korea Petrochemical Ind. Co. Ltd., VH035, melting point 135° C.) having a weight average molecular weight of 400,000 as polyolefin, silane-grafted polyethylene (Hyundai EP, XP650), and liquid paraffin oil (Kukdong Oil & Chem. LP350F, dynamic viscosity 50 cSt at 40° C.) as a diluting agent were introduced to an extruder at a weight ratio of 15:15:70. Extruded amount was 80 kg/hr, wherein the extruded amount of polyethylene was 12 kg/hr, that of silane-grafted polyethylene was 12 kg/hr, and that of the diluting agent was 56 kg/hr. In addition, trimethoxyvinylsilane was introduced as alkoxysilane containing a carbon-carbon double bonded group in an amount of 2 parts by weight based on 100 parts by weight of the total content of polyolefin, silane-grafted polyethylene and diluting agent. Further, 2,5-dimethyl-2,5-di(tert-butylperoxy)hexane (DHBP) as an initiator was introduced in an amount of 5 parts by weight based on 100 parts by weight of the alkoxysilane containing a carbon-carbon double bonded group. In addition, dibutyltin dilaurate as a crosslinking catalyst was added in an amount of 5 parts by weight based on 100 parts by weight of the alkoxysilane containing a carbon-carbon double bonded group.

Comparative Example 3—not Crosslinked Polyolefin Separator

A crosslinked polyolefin separator was obtained in the same manner as Comparative Example 1, except that high-density polyethylene, the diluting agent and magnesium hydroxide (Nabaltech Co., APYMAG100) were introduced to the extruder at a weight ratio of 25:55:20.

Comparative Example 4—Inorganic Particles Not Surface-Treated with Silane Used A crosslinked polyolefin separator was obtained in the same manner as Comparative Example 1, except that high-density polyethylene, the diluting agent, vinyltrimethoxysilane and silica (Korea Nanomaterial Co., KRU1133M) were introduced to the extruder at a weight ratio of 24.8:54.6:0.8:19.8.

Test Examples

Each of the separators according to Examples 1 and 2 and Comparative Examples 1-4 was evaluated. The results are shown in the following Table 1.

TABLE 1

|  | Ex. 1 | Ex. 2 | Comp. Ex. 1 | Comp. Ex. 2 | Comp. Ex. 3 | Comp. Ex. 4 |
|---|---|---|---|---|---|---|
| Extruder temperature (° C.) | | | | 220 | | |
| Thermal fixing temperature (° C.) | | | | 132 | | |
| Content of alkoxysilane containing carbon-carbon double bonded group (based on 100 parts by weight of total content of polyolefin and diluting agent) | 2 | 2 | 2 | 2 | — | 2 |
| Thickness of separator (μm) | 8.9 | 8.8 | 9.1 | 8.8 | 9.2 | 9.2 |
| Air permeation time (s/100 cc) | 135 | 128 | 1,780 | 2,110 | 103 | 133 |
| Heat shrinkage MD | 11 | 12 | 25 | 24 | 12 | 11 |
| Heat shrinkage TD | 7 | 8 | 15 | 17 | 8 | 10 |
| Die-drooling generation | No | No | Yes | Yes | No | Yes |
| TMA meltdown temperature (° C.) | 204 | 193 | 204 | 182 | 145 | 183 |
| Resistance (ohm) | 0.38 | 0.37 | 1.83 | 1.14 | 0.38 | 0.39 |
| Determination of increase in pressure in extruder (ΔMpa/hr) (G/P increase in pressure at front end portion ΔMpa/hr) | 0.1 or less | 0.1 or less | 0.3 or more | 0.2 or more | 0.1 or less | 0.3 or more |

In the case of Comparative Example 1, inorganic particles surface-treated with silane was not introduced. It can be seen that die-drooling occurs and the separator shows a long air permeation time and high resistance.

In the case of Comparative Example 2, silane-grafted high-density polyethylene was introduced separately. It can be seen that the separator according to Comparative Example 2 causes die-drooling and shows a long air permeation time. In addition, in the case of Comparative Example 2, silane-grafted high-density polyethylene cannot be dispersed homogeneously in the extruder, and thus the separator shows a lower meltdown temperature as compared to Examples.

In the case of Comparative Example 3, inorganic particles subjected to no surface-treatment were introduced. In the case of Comparative Example 3, no die-drooling occurs but the separator shows a significantly low meltdown temperature of 145° C. Thus, it is not possible to realize a desired effect of improving heat resistance.

The separator according to Comparative Example 4 shows an air permeation time and resistance value similar to those of Example 1. However, Comparative Example 4 uses no inorganic particles surface-treated with silane and there is no inorganic particle-silane coupling, resulting in generation of die-drooling. In addition, a large amount of alkoxysilane containing a carbon-carbon double bonded group is lost due to die-drooling to cause a decrease in crosslinking degree of the finished separator and an increase in pressure in the extruder.

Test Methods (1) Thickness of Separator

The thickness of a separator was determined by using a thickness measuring system (VL-50S-B available from Mitutoyo Co.).

(2) Air Permeation Time

Air permeation time was determined by using a Gurley type air permeability tester according to JIS P-8117. Herein, the time required for 100 cc of air to pass through a diameter of 28.6 mm and an area of 645 mm² was measured.

(3) Heat Shrinkage

Heat shrinkage was calculated by the formula of (Initial length−Length after carrying out heat shrinking treatment at 120° C. for 1 hour)/(Initial length)×100

(4) Die-Drooling Phenomenon

It is judged that a die-drooling phenomenon occurs, when 3 or more foreign materials having a diameter of 1.0 mm or more are detected in a T-die, after extrusion is carried out by the method for manufacturing a crosslinked polyolefin separator according to each of Examples and Comparative Examples.

(5) Method for Determining Meltdown Temperature Based on Thermomechanical Analysis (TMA)

To determine heat resistance, TMA (TMA Q400 available from TA) was used to apply a load of 0.01N to a separator, and deformation of the separator was determined while increasing the temperature at a rate of 5° C./min. The temperature, where the separator was broken after it was shrunk and then elongated again as the temperature was increased, was determined. The temperature is defined as meltdown temperature. It can be said that as the temperature is increased, the separator maintains melt integrity at high temperature and has dimensional stability.

(6) Resistance

Each of the separators according to Examples and Comparative Examples was impregnated with an electrolyte and AC resistance was determined. The results are shown in Table 1. Herein, AC resistance is measured at 1 KHz by using a test available from Hioki.

(7) Determination of Increase in Pressure in Extruder

It is judged that the pressure in the extruder is increased, when a change in pressure (P1) at the front end of a gear pump after finishing the manufacture of a separator is 0.2 Mpa/h or more based on the initial pressure (P0) at the front end of a gear pump upon the manufacture of a separator.

What is claimed is:

1. A method for manufacturing a crosslinked polyolefin separator, comprising the steps of:
    hydrolyzing an alkoxysilane containing a carbon-carbon double bonded group with a solvent to obtain a silanol containing a carbon-carbon double bonded group, wherein the solvent is water, methanol, ethanol or propanol;
    mixing the silanol containing a carbon-carbon double bonded group with inorganic particles having at least one hydroxy group at 50° C.-80° C. to obtain surface-treated inorganic particles;
    mixing a polyolefin, a diluting agent, and the surface-treated inorganic particles in an extruder, and then adding an initiator and a crosslinking catalyst to obtain a mixture;
    extruding the mixture to form an extruded silane-grafted polyolefin composition;
    molding and orienting the extruded silane-grafted polyolefin composition in a form of an oriented sheet;
    extracting the diluting agent from the oriented sheet to obtain a porous membrane;
    thermally fixing the porous membrane to obtain a thermally fixed porous membrane; and
    crosslinking the thermally fixed porous membrane in the presence of moisture,
    wherein the inorganic particles are particles of a metal hydroxide, and the metal hydroxide is at least one of aluminum hydroxide, magnesium hydroxide, calcium hydroxide, or boehmite.

2. The method for manufacturing a crosslinked polyolefin separator according to claim 1, wherein the polyolefin has a weight average molecular weight of 200,000-1,000,000.

3. The method for manufacturing a crosslinked polyolefin separator according to claim 1, wherein in the extruded silane-grafted polyolefin composition, the surface-treated inorganic particles have the silanol containing a carbon-carbon double bonded group coupled thereto via oxygen (O) atoms.

4. The method for manufacturing a crosslinked polyolefin separator according to claim 1, wherein in the extruded silane-grafted polyolefin composition, the surface-treated inorganic particles comprise the inorganic particles to which the silanol containing a carbon-carbon double bonded group are chemically bound via oxygen atoms.

5. The method for manufacturing a crosslinked polyolefin separator according to claim 1, wherein in the extruded silane-grafted polyolefin composition, the inorganic particles are bound to the silicon atoms of the grafted silane via oxygen (O) atoms.

6. The method for manufacturing a crosslinked polyolefin separator according to claim 1, wherein the crosslinking of the thermally fixed porous membrane in the presence of moisture comprises:
    moisture-crosslinking the silanol containing a carbon-carbon double bonded group with the polyolefin.

7. The method for manufacturing a crosslinked polyolefin separator according to claim 1, wherein the alkoxysilane containing a carbon-carbon double bonded group comprises a compound represented by Chemical Formula 2:

[Chemical Formula 2]

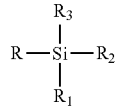

wherein each of $R_1$, $R_2$ and $R_3$ independently represents a $C_1$-$C_{10}$ alkoxy group or a $C_1$-$C_{10}$ alkyl group, with the proviso that at least one of $R_1$, $R_2$ or $R_3$ represents an alkoxy group; and R represents a vinyl group, an acryloxy group, a methacryloxy group, or a $C_1$-$C_{20}$ alkyl group, wherein at least one hydrogen atom of the alkyl group is substituted with a vinyl group, an acryloxy group, or a methacryloxy group.

8. The method for manufacturing a crosslinked polyolefin separator according to claim 7, wherein the alkoxysilane containing a carbon-carbon double bonded group is selected from the group consisting of vinyltrimethoxysilane, vinyltriethoxysilane, vinyltriacetoxysilane, (3-methacryloxypropyl) trimethoxysilane, (3-methacryloxypropyl) triethoxysilane, vinylmethyl dimethoxysilane, vinyl-tris(2-methoxyethoxy) silane, vinylmethyldiethoxysilane, and a mixture thereof.

* * * * *